May 2, 1967

W. E. ELLIOTT ETAL 3,317,349

AMBIPOLAR BATTERY INCLUDING ELECTRODES
OF IDENTICAL NICKELOUS COMPOSITION

Filed March 15, 1963

Inventors
William E. Elliott
James R. Huff
By Donald C. McGaughey
Attorney

May 2, 1967
W. E. ELLIOTT ETAL
3,317,349
AMBIPOLAR BATTERY INCLUDING ELECTRODES
OF IDENTICAL NICKELOUS COMPOSITION
Filed March 15, 1963
4 Sheets-Sheet 2
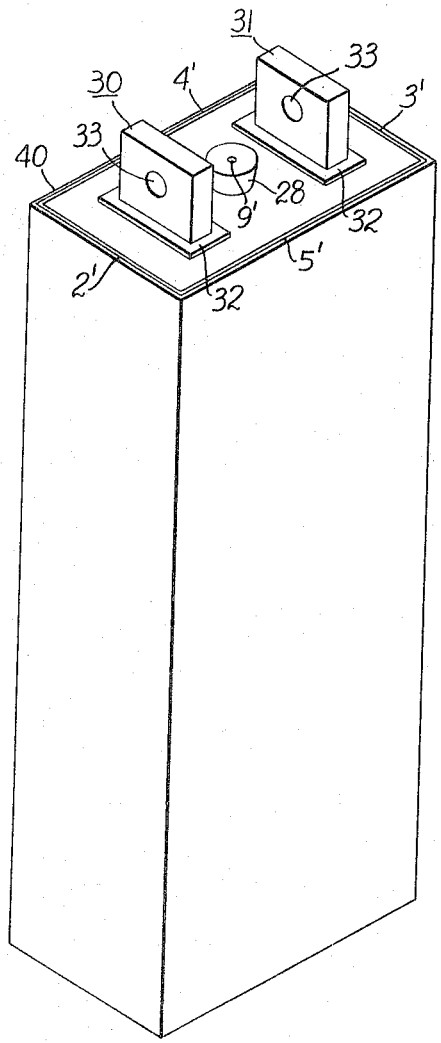
Fig. 3
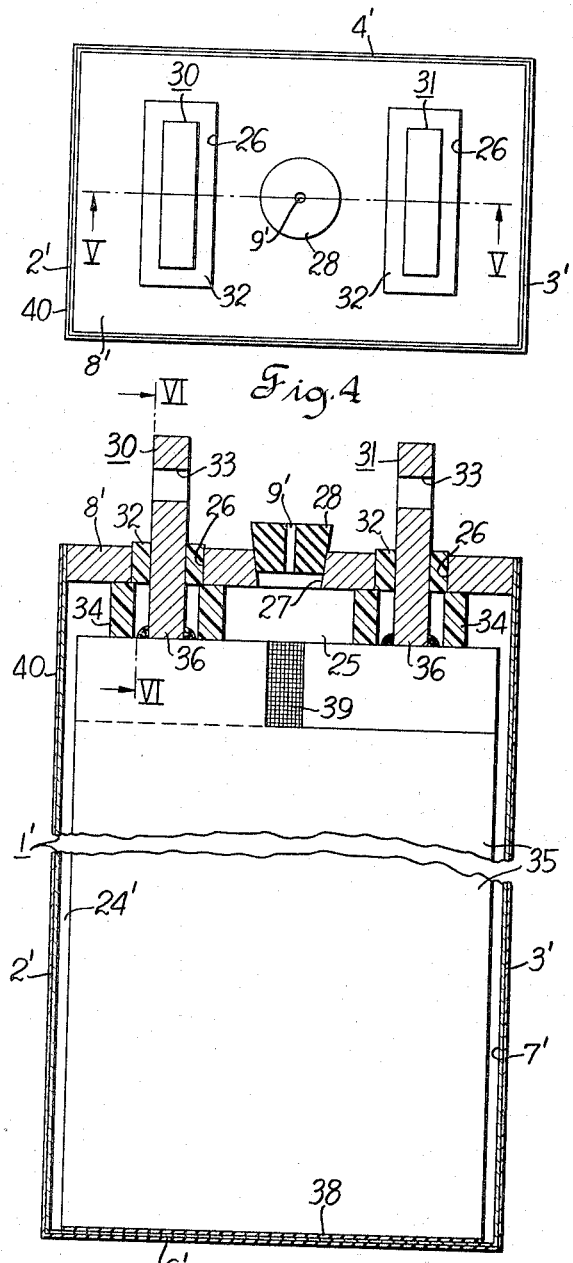
Fig. 4
Fig. 5
Inventors
William E. Elliott
James R. Huff
By Donald C. M. Ingley
Attorney

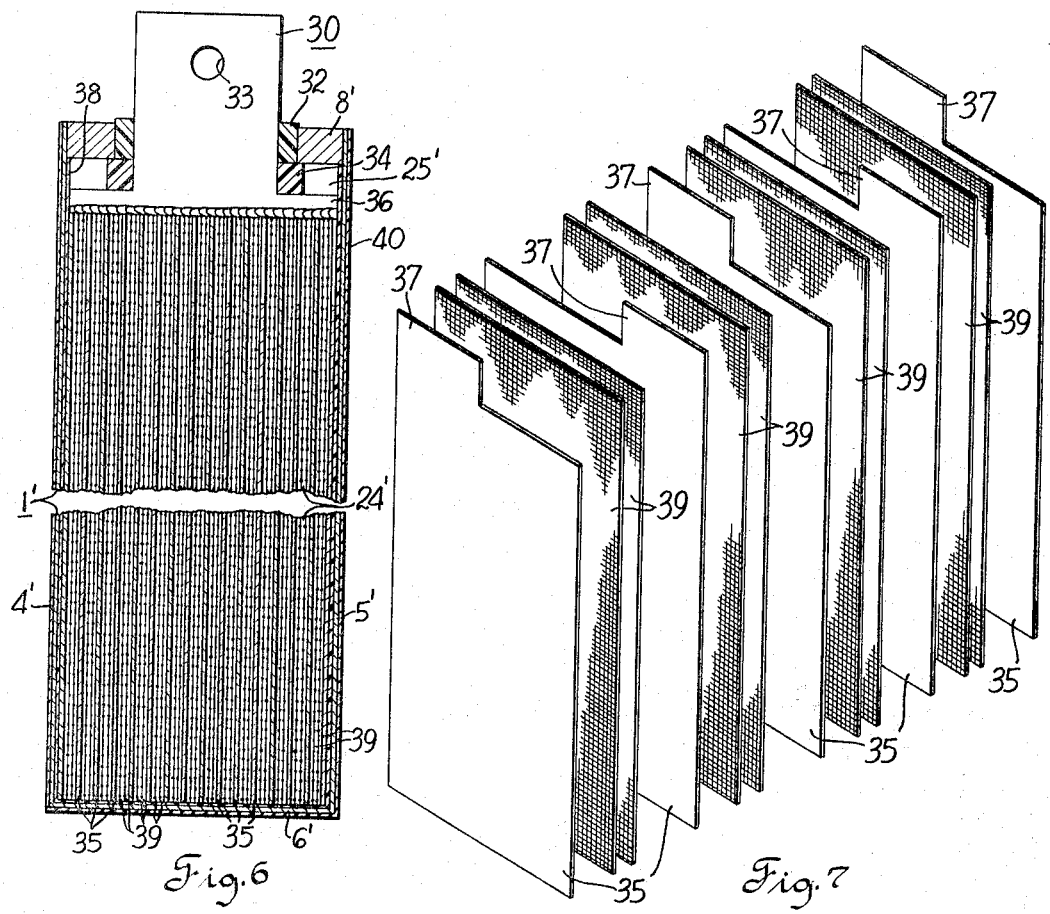

United States Patent Office 3,317,349
Patented May 2, 1967

3,317,349
AMBIPOLAR BATTERY INCLUDING ELECTRODES OF IDENTICAL NICKELOUS COMPOSITION
William E. Elliott, Elm Grove, and James R. Huff, Milwaukee, Wis., assignors to Allis-Chalmers Manufacturing Company, Milwaukee, Wis.
Filed Mar. 15, 1963, Ser. No. 265,534
6 Claims. (Cl. 136—86)

The present invention relates to an electrical energy storage cell. More particularly our invention relates to a rechargeable cell comprising electrode pairs in contact with an electrolyte. Upon one electrode of the pair is stored chemisorbed hydrogen and upon the other is stored a metastable oxide in a manner permitting a rapid release or discharge of this stored energy.

Chemical batteries have been widely used to store and release electrical energy. A battery comprises an assembly of cells which convert chemical energy directly into electrical energy. Common to all batteries are positive and negative electrodes, a liquid or gel electrolyte, separators, collectors, cases and terminals. These elements are modified according to the needs of the particular battery.

Batteries are classified into two broad subdivisions, primary batteries and secondary batteries. A primary battery is designed for only a single use. A very serious limitation of primary batteries is that the chemical reaction which supplies the electrical energy is not practicably reversible. After the reaction is completed, the battery must be discarded. Primary cells are in the main limited to applications calling for intermittent use at low discharge rates and where replacement is feasible.

A secondary battery makes use of a reversible chemical reaction so that after discharge, the passage of direct current through the cell will reverse the chemical reaction and return the cell to a charged condition. Known secondary systems have a limited depth of discharge. If discharge drives the current producing chemical reaction beyond a specific point, great difficulty is experienced in reversing the reaction. For example, insoluble lead sulfate will slough off the widely used lead acid cell if the discharge is excessive. Valuable and otherwise useful space must be provided at the bottom of the cell for sloughed off lead sulfate to accumulate so that it does not collect sufficiently to come in contact with the plates and short circuit the battery.

Another serious limitation of known secondary systems is their low power to weight and low power to volume ratios. In some systems these ratios are raised by the density of electrode material, and space required by bulky separators.

In other systems, elaborate cell separators are required to segregate the electrodes. For example, the silver zinc and silver cadmium systems, although having an acceptable power to weight ratio, suffer acutely from silver migration. Furthermore, the high cost ($800 to $1000 per installed kilowatt storage capacity) precludes the use of silver systems in any but specialized applications.

The regenerative fuel cells have been a partial solution to the energy storage problem. The regenerative fuel cell stores the products formed through electrolysis of the electrolyte. Recombination of these products fuels the cell and produces power. The striking difference between regenerative fuel cells and secondary batteries is that at least one reactant is stored as a gas, rather than as a chemical species of the electrode. Thus, in a regenerative fuel cell, the current producing reaction is that of a gas at an electrode rather than a reaction of the electrode itself.

A great need therefore exists for a high energy electrochemical system with improved energy storage density, much improved depth of discharge, combined with low cost. Such high energy systems would find wide acceptance as a source of portable power for vehicles, machinery, lighting, and in the transport, defense and manufacturing fields.

Accordingly, it is an object of our invention to provide a new class of battery that may be recharged.

It is also an object of our invention to provide a system which may be completely discharged without detriment to the cell.

A still further object of our invention is to provide a wholly novel secondary battery, in one embodiment of which the anode and cathode are ambipolar.

An additional object of our invention is to provide a rechargeable electrochemical system which delivers a constant discharge rate at a stable voltage.

A still further object of our invention is to provide a rechargeable electrochemical energy storage device which is simple to manufacture and is free from unduly thick cell separators and electrode compartmentalization.

Another object of our invention is to provide a rechargeable energy storage device which is uninjured by an overcharge or by charging at a too rapid rate.

These and other objects are achieved by the present invention which may be fully understood by an examination of the following specification and claims, and of the accompanying drawings in which:

FIG. 3 is a perspective view of an outer housing of an ambipolar embodiment of our invention;

FIG. 4 is a top view of the outer housing shown in FIG. 3;

FIG. 5 is a section through line V—V of FIG. 4;

FIG. 6 is a section through line VI—VI of FIG. 5;

FIG. 7 is an exploded view of the internal arrangement of the embodiment of FIG. 3;

Figures 1, 2:
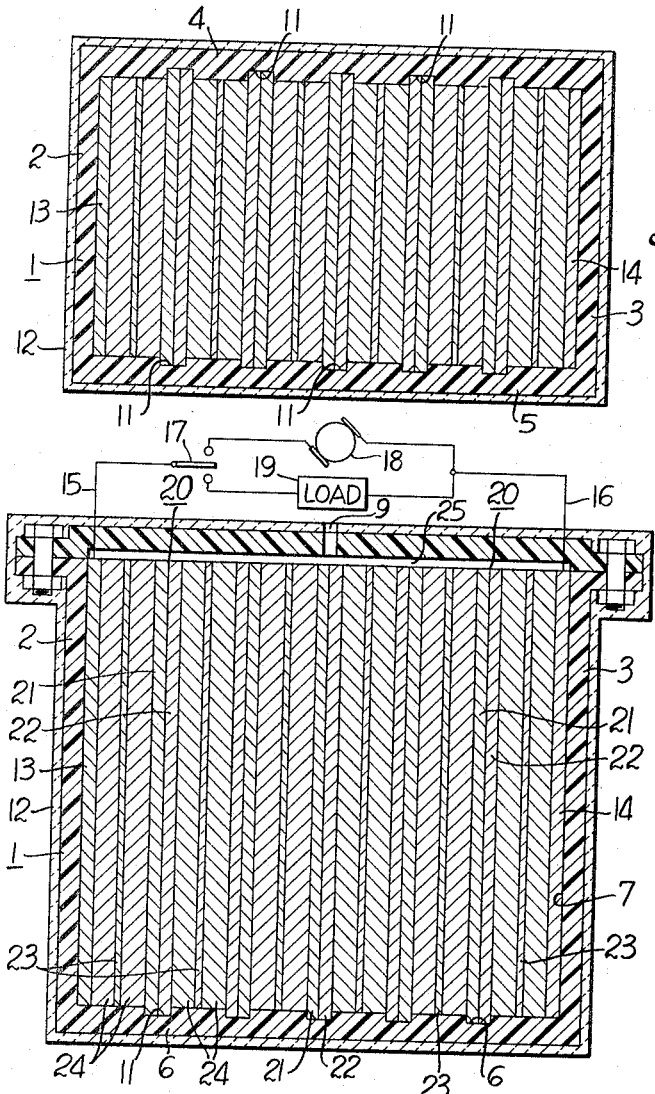
FIG. 1 is a schematic top view of one embodiment of our invention with the cover removed.
FIG. 2 is a schematic cross sectional view of the same cell with the cover in place.

With particular reference to the battery depicted in FIGS. 1 and 2, we shall now explain the detail of its construction. We believe that we have discovered a novel system for storing energy. The embodiment described is a module of our invention comprising a plurality of cells. The cells are electrically communicative by means of intermediate bipolar electrodes. This type of series intercell connection is well known in the battery art. The embodiment described is eminently suited for commercial adaptation because the module voltage is a sum of the individual cell voltages.

The battery shown comprises a housing 1, having end walls 2, 3, side walls 4, 5, and a bottom 6. Within housing 1 is a space 7. A cover 8 having a vent 9 is fitted or bolted into position.

The housing 1 is constructed of a liquid tight, inert material which is electrically nonconductive or the electrodes effectively insulated from the housing so as to avoid short circuiting the cell. In addition to withstanding any corrosive action of an electrolyte, the housing material 1 must not enter into the cell reaction. The housing must also have high heat distortion characteristics designed to withstand the relatively high temperatures (90°–100° C.) at which the cell may operate. The housing, like any battery case, must be of high impact strength so as to resist shocks and consequent breaking because the electrolyte, if spilled, can be highly corrosive. Housings which we believe to be particularly well suited are thermosetting resins such as polyepoxides; nickel; and stainless steel.

A slotted means 11 is either machined or molded into the side walls 4, 5 and bottom 6 of housing 1. At end wall 2 a cathode 13 is attached. At the opposite end wall 3 an anode 14 is attached. Leads 15 and 16 are connected to electrodes 13 and 14 respectively, and are externally connected by a switching device 17 to either a charging means 18 or a load 19. A plurality of intermediate bipolar electrodes exemplified by 20 having one side functioning as an anode 21 and the other side functioning as a cathode 22 suitably attached to each other in electrical contact are mounted into slots 11. The slots 11 serve several functions. They hold the intermediate electrodes secure from contact with one another. They prevent migration of electrolyte from one cell to another. They also allow speedy removal of an electrode for servicing without disrupting cell operation.

To insure prevention of electrodes 20 contacting one another, a spacer 23 may be interposed between each bipolar electrode 20, and the bipolar electrodes 20 and the end electrodes 13, 14. An electrolyte 24 is disposed within space 7 so that it contacts the electrodes. Above the electrodes is a space 25 to accommodate expansion of the electrolyte and to collect gaseous vapors from the cell and exhaust them through vent 9.

Since there may be some gassing of the cell during the charging cycle, as shall be explained in detail later, relief vent or valve 9 is necessary to relieve the cell module interior 25 of this gas. This gas will be explosive in nature so that during charging the cell should be adequately ventilated. This gassing only occurs during charging and at all other times the valve may be set to function only to relieve pressure caused by electrolyte expansion or vaporization to electrolyte solvent. Thus, at all times other than charging, the cell module can be sealed and isolated from its environment.

Since certain cells of our invention may be operated at temperatures approaching 100° C. an insulating means 12, such as a jacket filled with cellular material such as mineral wool, glass fibers or the like, may be provided. Such means may also include an enclosed air space or evacuated space. This insulating means serves two functions. First, it protects those who may come in contact with the cell from burns and secondly, it preserves the thermal gradient between cell temperature and ambient temperature.

Means, not shown in the drawings, such as heating coils or cooling coils may be provided within or without the cell, or may be enclosed within the walls of the housing to maintain a more uniform cell temperature if desired. In certain short cycle operations it may be desirable to heat the cell to an efficient operating temperature concurrent to charging. The thermal insulation 12 and heat capacity of the electrolyte 24 will then help contain the heat during the discharge portion of the cycle.

With particular reference to FIGS. 3, 4, 5, 6 and 7, the embodiment shown possesses electrodes of identical construction. This novel embodiment is ambipolar. An ambipolar device may be charged in one direction or polarity, discharged, and then recharged in the opposite or reverse polarity. This reversal need not be a cyclical function but may follow any desired order. For example, the ambipolar battery may be operated 50 cycles in one polarity, followed by 25 cycles in the opposite polarity.

The ambipolar modification comprises a corrosion resistant housing 1' constructed of stainless steel having end walls 2', 3', side walls 4', 5', and a bottom 6'. Within the housing is a space 7'. A nickel cover 8', having rectangular holes 26 and round hole 27, is fitted to the top of housing 1'. A rubber stopper 28 with a small bore hole 9' 1/16–1/8 inch in diameter fits into hole 27. Removal of stopper 28 permits filling and replenishing the cell with electrolyte. Bus bars 30, 31 extend through the rectangular holes 26 and are held rigid and electrically insulated from the cover 8' by a barrier of epoxy resin 32. Bus bars 30, 31 are provided with holes 33 so as to attach external leads thereto. With special attention to FIGS. 5 and 6, the cover 8' is also held in place by a plastic retainer 34 which insures the cover from falling into space 7'.

The electrodes 35 are of identical construction. The electrode comprises two sintered nickel plaques about 0.030 inch in thickness. Between these plaques has been positioned a layer of carbonyl nickel powder on a supportive nickel screen. The layer is from 0.030–0.01 inch thick. This assemblage is compressed using rollers to a combined thickness of about 0.025 inch. A nickel lead or tap 36 is spot welded to the extension 37 of electrode 35. The embodiment shown comprises a parallel electrical circuit arrangement. Therefore the electrodes are arranged such that alternate electrodes have tap 36 welded to bus bar 30 and the remaining electrodes have tap 36 welded to bus bar 31.

In an ambipolar modification, neither of the electrodes attached to bus bar 30 nor the electrodes attached to bus bar 31 is properly termed an anode or a cathode. The nomenclature anode and cathode is a function of operation. As we have stated this modification can interchangeably be operated in either polarity and it is meaningless to refer to anode or cathode when the cell is uncharged.

The electrodes 35 are prevented from contacting the stainless steel housing 1' as shown in FIG. 6 by a polyethylene or polytetrafluoroethylene sheet 38 surrounding the electrodes on the sides and bottom. If the electrodes were not so protected, the housing 1' might short circuit the cell.

Adjacent electrodes, since attached to alternate bus bars, must not contact one another. A polypropylene screen 39 is interposed between the electrodes. If additional spacing is required, two screens may be used.

Space 7' is then filled to about two inches of the top of the cell through hole 27 with electrolyte 24'. The electrolyte we prefer is potassium hydroxide at a concentration greater than 20% by weight and preferably 35% by weight. A corrosion inhibiting concentration of lithium hydroxide is also added to the electrolyte. We prefer a concentration of about 0.50 to 0.75% lithium hydroxide by weight. The electrolyte is never filled completely to the top of the cell because space 25' must remain to provide for expansion and gassing of the electrolyte.

The entire cell is then wrapped with rubber coated cloth 40 to electrically isolate the cell.

Figure 8:
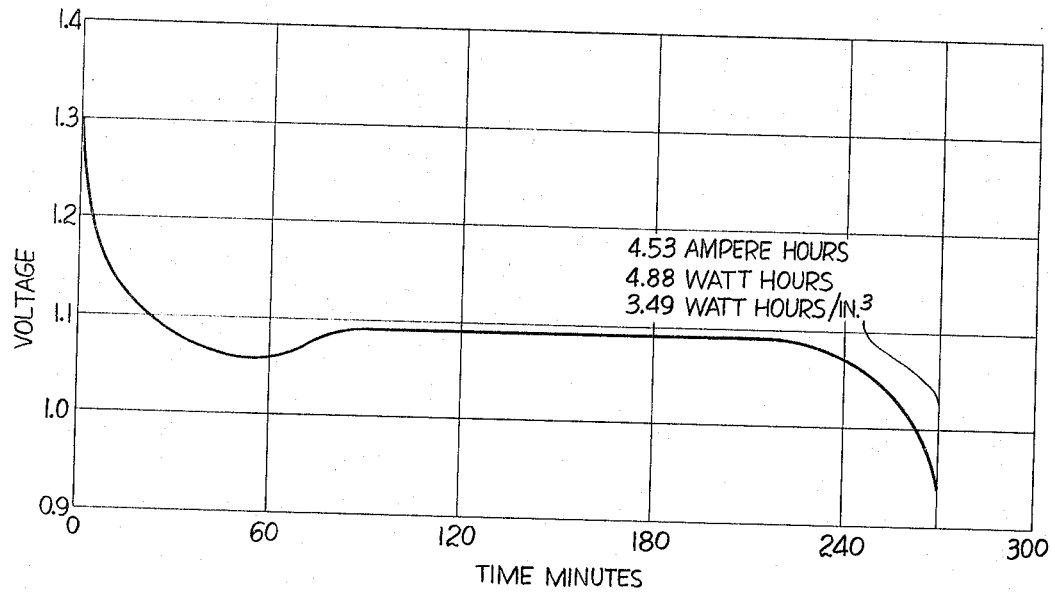
FIG. 8 is a discharge curve of one embodiment of our invention.

The graph of FIG. 8 represents the voltage plotted as a function of time in hours of a particular nickel anode-nickel cathode cell of a type more particularly described later, which has been discharged through a one ohm load. The cell shows a level discharge curve until the cell is exhausted as marked by a rapid fall off in voltage. This particular cell after 4.5 hours has delivered 4.53 ampere hours, 4.88 watt hours, and has a storage density of 3.49 watt hours per cubic inch. This cell was subjected to fifty charge-discharge cycles. Each cycle involved discharging the cell to zero volts. The graph represents the discharge of the fiftieth cycle. This cell has not suffered any damage or ill effects from complete discharge.

No explanation can be advanced at this time for the preliminary voltage drop of 0.03 volt followed by a rapid recovery during the first 90 minutes' operation. In our experience this indicates the cell is functioning well and can be expected to give an efficient discharge.

Figure 9:
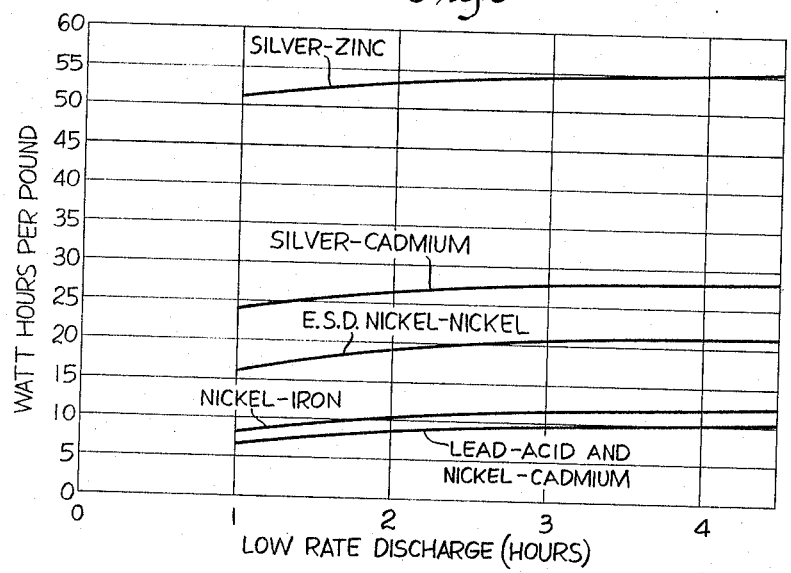
FIG. 9 is a graphical comparison of the power to weight ratios of various secondary systems including the nickel anode-nickel cathode embodiment of our energy storage device (ESD).

The graph of FIG. 9 represents graphically the power to weight ratio expressed in watt-hours per pound plotted as a function of discharge time in hours. It will be noticed that the nickel anode, nickel cathode energy storage device (ESD) displays a power to weight ratio superior to the lead-acid, nickel-cadmium, and nickel-iron secondary systems.

Confusion often arises as to which electrode of a reversible cell is the cathode and which the anode. It is accepted convention that electrochemical oxidation occurs at the anode and electrochemical reduction at the cathode. Because the reduced chemical species formed during the charge cycle will be oxidized upon discharge, the electrode that is a site for reduction (a cathode) during charge, becomes a site for oxidation (an anode) during discharge. So as to apply a consistent name to the electrodes, although not always a name consistent with the chemical processes occurring there, the convention has been adopted throughout this specification of referring to the electrodes as if they were discharging. Thus, the electrode which is the anode during discharge is also referred to as the anode during charge, and the cathode electrode likewise.

With the nomenclature of the anode and cathode in mind, we should now like to explain the mechanism by which our invention operates. The anode of our invention must, during charging, chemisorb hydrogen. Chemisorption differs from physical adsorption. Those forces which cause physical adsorption are analogous in energy to those forces which cause condensation of a gas. The heat evolved upon physical adsorption is small, and the adsorption is completely reversible. Chemisorption evolves a considerably larger amount of heat and a true surface compound is formed. In chemisorption the surface compound, according to some authors, is of only one chemisorbed layer, while a physically adsorbed layer may be many molecules thick.

The mechanism by which we believe our invention stores energy is initiated through the electrolysis of water. Confining our attention to the anode, water is there reduced and the hydrogen formed during the charge cycle is chemisorbed on the anode electrode surface. In the equation below M represents the anode material.

$$M + H^+ + e^- \rightarrow M(H) \text{ in acid electrolyte}$$
$$M + H_2O + e^- \rightarrow M(H) + OH^- \text{ in basic electrolyte}$$

Some anode materials which we find suitable are: carbon or graphite in their many proprietary forms; nickel; copper-nickel alloys; cadmium, iron, cobalt; platinum; palladium; chromium monophosphide; molybdenum-iron; manganese dioxide-ferric oxide; nickel oxide; mixed nickel-nickel oxide; ferric oxide-cupric oxide, lead; tungsten; molybdenum, and like materials, which chemisorb hydrogen, in such forms as rolled, sintered or powdered. Anode material such as ferric oxide-cupric oxide and like materials may be contained between plates of porous nickel or other suitable porous plates. Apparent though it may be to one skilled in the art, it should be emphasized that since chemisorption is a surface phenomenon, the anode materials, efficiency is greatly enhanced by increasing its surface area. Consequently, the physical forms of the anode should be chosen to provide increased surface area. Sintered electrodes and electrodes produced through powder or fiber metallurgy are much preferred.

We have found the chemisorption of hydrogen is one mechanism by which the anode of our invention stores energy. Certain anodes, in addition to the chemisorption of hydrogen, store energy by a second mechanism which is a reduction of the anode material, such that during discharge this material, together with the chemisorbed hydrogen, is oxidized with the concomitant release of energy. Thus, upon discharge, two anode reactions occur to supply electrons to the external circuit. The first is the oxidation of the chemisorbed hydrogen. The second is the oxidation of the anode material. These reactions are termed in the art as reactions at mixed potential. They are concurrent or dual reactions and the resultant voltage is an average of the potential of both. This average is, however, not an arithmetic average but is a weighed average, the derivation of which depends on the participation of the reactants.

Such reactions at mixed potential are possible only if the oxidation potential of the anode material lies within a specified range about the hydrogen oxidation potential. If the oxidation potential is too negative, the chemisorbed hydrogen may not be oxidized. If the oxidation potential is too positive, hydrogen will not form.

The oxidation potential of any material in an aqueous solution is partially a function of the ionic activity and the temperature. The oxidation potential range we have found particularly desirable to obtain a dual reaction is the range wherein the oxidation potential of the anode material is within ±0.20 volt of the hydrogen oxidation potential at any given pH, at any given ionic activity, or at any given temperature.

Therefore the oxidation potential of the anode material in, for example, a basic electrolyte at unit activity and 25° C. should lie within ±0.20 volt of the hydrogen oxidation potential at that given activity and temperature or therefore within the range −1.03 to −0.63 volt.

The oxidation potential of the anode material is measured against the International Standard Hydrogen Electrode. The oxidation potential of the International Standard Hydrogen Electrode in base, at an ion concentration of unit activity at 25° C. is $$2H_2O + 2e^- \rightarrow H_2 + 2OH^- \quad E^0_{red} = -0.828 \text{ volt}$$

In acid electrolyte at unit activity and 25° C. the Standard Hydrogen Electrode reaction is $$2H^+ + 2e^- \rightarrow H_2 \quad E^0_{red} = 0.000 \text{ volt}$$

The anode materials which we have found to be capable of operating at a mixed potential when used in our invention include anodes constructed of nickel, nickel alloys, nickel oxides, cadmium, iron and cobalt for use in basic electrolytes. From their oxidation potential, lead, tungsten and molybdenum should be suitable for use in acid electrolytes.

Reference to the following equations using as an example a nickel anode in a basic electrolyte will serve to illustrate what we believe to be the anode reactions at mixed potential.

$$Ni(H) + OH^- \underset{\text{charge}}{\overset{\text{discharge}}{\rightleftarrows}} Ni + H_2O + e^-$$

$$Ni + 2OH^- \underset{\text{charge}}{\overset{\text{discharge}}{\rightleftarrows}} Ni(OH)_2 + 2e^-$$

Any oxide of the anode formed will become hydrated through action of the electrolyte. The oxide of nickel, given as an example in the above equations as $Ni(OH)_2$ is hydrated NiO. Nickel, of course, like the other transition metals and especially the triads of period VIII of the periodic table, can exist in a number of oxidation states and undoubtedly NiO is not present to the exclusion of the other possible oxides.

Now that we have explained the mechanism by which the anode stores energy, we turn our attention to the cathode. At the cathode, oxygen is stored in a basic electrolyte system during the charge cycle as a metastable oxide of the cathode in accord with the reaction;

$$M + 2OH^- \rightarrow M(O) + H_2O + 2e^-$$

While we believe the major portion is stored as the metastable oxide, it is possible that a minor portion may be stored by the following mode;

$$M + 4OH^- \rightarrow M(O_2) + 2H_2O + 4e^-$$

which represents chemisorption of oxygen.

In an acidic electrolyte system the metastable oxide is formed according to the reaction;

$$H_2O + M \rightarrow M(O) + 2e^- + 2H^\oplus$$

and if through chemisorption;

$$2H_2O + M \rightarrow M(O_2) + 4e^- + 4H^+$$

The metastable oxide need not be necessarily an oxide of the cathode material. It may be an oxide formed by the interaction of the electrolyte with the cathode. Therefore we are using the term metastable oxide in the broad sense. Within this term we include any oxidation that has raised the oxidation level of the cathode. For example, the sulfate ion interacts at a carbon surface to form a peroxysulfate.

As is known, the transition metals of the periodic table are capable of forming oxides of varying oxidation states. Some of these species are in high energy states and exist therefore in a reactive form which may be more or less transitory in nature. A metastable oxide is such an oxide. Those metals chosen from the transition series form metastable oxides in our invention and are therefore suitable for use as cathodes. Many of the materials we have used as anodes are also suitable for use as cathodes, for example, nickel, nickel alloys and carbon. Cobalt and cadmium are unsuitable for cathodes because they are consumed and hence the cell cannot be recharged.

Ambipolarity is a surprising feature of several embodiments of our invention. It is to be understood that in our ambipolar modifications the electrode materials are chosen so that the device may be operated satisfactorily with the electrode polarity interchanged. An ambipolar modification inherently possesses no predetermined polarity. Once charged, however, polarity exists until the cell has been discharged. After discharge the selection of polarity is again a matter of choice. To achieve ambipolarity, we have found it necessary to limit the choice of the electrode materials.

In one modification nickel in such forms as rolled, sintered or powdered is used. The construction material may also be nickel oxide for one or both electrodes. Difficulty is experienced in handling nickel oxide electrodes prior to assembling because they are not as mechanically stable as nickel electrodes. Therefore, a nickel electrode ambipolar modification with both electrodes of an anode-cathode pair constructed from nickel is preferred.

A device with electrodes constructed of nickel or nickel oxide will not only chemisorb hydrogen at the anode but will also operate by means of a dual reaction. Thus a device constructed from nickel electrodes (a nickel anode-nickel cathode ESD) will discharge by means of reactions at mixed potential at the anode.

Carbon and graphite in their many proprietary forms are also suitable for use as electrodes in ambipolar modifications. These do not operate by means of a dual reaction, but do chemisorb hydrogen at the anode and form a metastable oxide at the cathode.

The electrolyte of our invention can be any aqueous solution that has high conductivity. The basic electrolytes comprise substances such as the alkali hydroxides and alkali carbonates. We prefer an electrolyte comprising greater than 20% by weight of potassium hydroxide and sufficient lithium hydroxide to inhibit corrosion.

Such an electrolyte mixture is well known in the battery art as a lithiated potassium hydroxide. Neutral salts, such as the salt obtained from the neutralization of a strong base with a strong acid, for example sodium sulphate, yield a neutral solution and are quite suitable for use as electrolyte. When an acid electrolyte is suitable, sulphuric acid is quite satisfactory.

Our invention is charged by any conventional method used to charge a secondary battery. This direct current may be obtained from a motor generator set, a rectifier, solar battery, a fuel cell or the like. The positive and negative terminals of the charging device should be connected to the cathode and anode respectively of the energy storage device, keeping in mind the convention we have adopted. In ambipolar modifications, it is immaterial to which electrode the charging device is attached.

A trickle or a taper charge is one that results in the most efficient utilization of energy. If there is too rapid application of charge, there may be some gassing.

Thus gassing results from electrolysis of the electrolyte and other than causing a loss of electrolyte solvent, it is harmless to the battery. The gases evolved are usually hydrogen and oxygen and adequate ventilation should be supplied to prevent these gases from forming an explosive mixture.

The open circuit voltage is somewhat dependent on the charging voltage, current, and length of charge. One skilled in the art may through routine experimentation rapidly determine the proper charging current parameters for the ESD being charged and the particular charging source used. Generally the open circuit voltage of the nickel anode-nickel cathode ESD exhibited a maximum voltage ranging from 1.4 to 1.6 volts per cell at room temperature. At temperatures of 90° C. the maximum open circuit voltage of the nickel anode-nickel cathode ESD ranged from 1.2 to 1.5 volts per cell. Table I compares the nominal cell voltage, in addition to other characteristics, of various representative secondary battery systems.

TABLE I

| Battery type | Volts per cell | Kilowatt-hours per cubic foot | Watt-hours per pound |
|---|---|---|---|
| Lead-acid | 2.1 | 2.35 | 11 |
| Nickel-iron | 1.2 | 1.2 | 13 |
| Nickel-cadmium | 1.25 | 1.59 | 12 |
| Silver-cadmium | 1.1 | [1] 3.46–8.65 | 22 |
| Silver-zinc | 1.5 | [1] 8.15 | 38–66 |
| ESD (Nickel anode-Nickel cathode) | 1.35 | [2] 3.46 | 15–16 |

[1] At low current drain.
[2] Average value.

Although the energy storage device of our invention is operative throughout the entire conductive range of the electrolyte, that is between the freezing point and the boiling point, the device of our invention is temperature dependent. Investigations of the half cell characteristics on discharge reveal that at room temperature the anode electrode is the limiting electrode. At 90° C., on the other hand, the cathode electrode limits the cell storage capacity. Reference to Table II discloses that cells of the same construction store about 35 times the energy at 90° C. than is stored at room temperature. We believe this temperature dependency is a combined result of the temperature dependency of ionic conductance, formation of the metastable oxide, and increased ease of formation of the chemisorbed hydrogen bond. A balanced cell for a selected operating temperature can be easily devised. For example, the surface area and amount of anode and cathode material can be controlled in cells selected for operation at elevated temperatures.

TABLE II

| Electrodes | | Electrolyte | Temperature | Energy, watt-seconds/in.³ |
|---|---|---|---|---|
| Anode | Cathode | | | |
| Sheet Nickel | Sheet Nickel | Potassium hydroxide | Room temp | 4.7 |
| Do | do | do | do | 23.6 |
| Do | Sintered Nickel plus Nickel Oxide | do | do | 56.7 |
| Sintered Nickel plus Nickel Boride | do | do | do | 102 |
| Do | do | do | 90° C | 562 |
| Do | Sintered Nickel plus Nuchar WA | do | 90° C | 24.4 |
| Rolled Sintered Nickel | Rolled Sintered Nickel plus Nickel Oxide | do | Room temp | 152.5 |
| Rolled Sintered Nickel plus Nickel Oxide | do | do | do | 111 |
| Do | do | do | 90° C | 3,800 |
| Do | Rolled Sintered Nickel plus Boron Doped Silver | do | 90° C | 2,960 |
| Rolled Sintered Nickel plus Nickel Boride | Rolled Sintered Nickel plus Nickel Oxide | do | 90° C | 962 |
| Sintered Nickel plus High Surface | do | do | 90° C | 2,620 |
| Sintered Nickel plus High Surface Area Nickel | Sintered Nickel plus Nickel Oxide | do | Room temp | 750 |
| Do | Sintered Nickel plus High Surface Area Nickel | do | 95° C | 5,100 |
| Platinum | Platinum | do | Room temp | 0.56 |
| (Nickel) palladium | Carbon | do | do | 0.38 |
| Carbon | do | Potassium carbonate | do | 0.05 |
| Do | do | Sulfuric acid | do | 1.06 |
| Copper | do | do | do | 1.44 |
| Nickel | do | Sodium Sulfate | do | 0.18 |
| (Nickel) palladium | Platinum | Potassium hydroxide | do | 1.13 |
| Carbon | Carbon | do | do | 0.90 |

Consideration of Table II also discloses those electrode systems and electrolytes we have found particularly suitable in the practice of our invention, together with their energy storage density.

The nickel anode-nickel cathode ESD of our invention consistently demonstrates low internal resistance. These systems have never shown an internal resistance in excess of 0.3 ohm per square inch of electrode surface (0.002 ohm per square foot). Some nickel-nickel cells have an observed value as low as 0.06 ohm per square inch (0.0004 ohm per square foot).

Having now particularly described and ascertained the nature of our said invention and the manner in which it is to be performed, we declare that what we claim is:

1. An ambipolar electrical storage device capable of electrical discharge operation comprising a liquid tight housing; nonconsumable, electrically conductive anode and cathode electrodes mounted in spaced relation to each other in said housing; said anode being constructed from a nickelous material identical in composition to that selected for the cathode; an aqueous electrolyte disposed within said housing in contact with said electrodes; means for supplying a direct charge to said electrodes to electrolyze said electrolyte and store chemisorbed energy at the respective electrodes: said anode storing chemisorbed hydrogen and a reduced species of the anode, said cathode forming and storing a metastable oxide such that at discharge the chemisorbed materials and the reduced species of the anode material react simultaneously releasing stored energy as electrons flow through said external circuit.

2. The ambipolar energy storage device of claim 1 wherein the electrolyte has a pH $\geq 7$.

3. The ambipolar energy storage device of claim 1 wherein the electrolyte has a pH $\leq 7$.

4. The ambipolar energy storage device of claim 1 wherein the nickelous compound is selected from the group consisting of nickel, nickel boride and nickel oxide.

5. The ambipolar energy storage device of claim 1 wherein the anode and cathode are comprised of sintered nickel and nickel oxide.

6. An ambipolar energy storage device according to claim 1 in which a plurality of electrodes are arranged in a space relationship within said housing to define a plurality of interconnected cells.

References Cited by the Examiner

UNITED STATES PATENTS

| 408,287 | 8/1889 | Bottome. | |
| 876,445 | 1/1908 | Edison | 136—154 X |
| 1,436,873 | 11/1922 | Goodridge. | |
| 3,005,943 | 10/1961 | Jaffee | 136—86 X |
| 3,132,972 | 5/1964 | Ludwig | 136—86 |
| 3,202,544 | 8/1965 | Vielstich | 136—86 X |
| 3,230,114 | 1/1966 | Friese et al. | 136—86 |

FOREIGN PATENTS

| 616,031 | 3/1961 | Canada. |
| 325,530 | 1/1903 | France. |
| 5,261 | 1881 | Great Britain. |
| 315,209 | 9/1928 | Great Britain. |

WINSTON A. DOUGLAS, *Primary Examiner.*

ALLEN B. CURTIS, *Examiner.*